US009264522B1

(12) United States Patent
Reeves et al.

(10) Patent No.: US 9,264,522 B1
(45) Date of Patent: Feb. 16, 2016

(54) ENSURING COMMUNICATION DEVICE CAPABILITIES COMPLY WITH CONTENT PROVIDER SPECIFICATIONS

(75) Inventors: Raymond Emilio Reeves, Olathe, KS (US); Ryan Alan Wick, Punta Gorda, FL (US); Prabhat Karki, Olathe, KS (US); Richard J. Bassett, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1652 days.

(21) Appl. No.: 12/553,272

(22) Filed: Sep. 3, 2009

(51) Int. Cl.
*H04L 29/06* (2006.01)
*H04L 29/08* (2006.01)

(52) U.S. Cl.
CPC ............ *H04L 69/24* (2013.01); *H04L 67/2819* (2013.01)

(58) Field of Classification Search
CPC ............... H04L 67/2819; H04L 69/24; H04L 29/06537; H04L 51/06
USPC ........................................................ 709/201
See application file for complete search history.

(56) References Cited

U.S. PATENT DOCUMENTS

| 6,477,550 | B1 | 11/2002 | Balasubramaniam et al. | |
|---|---|---|---|---|
| 6,651,084 | B1 * | 11/2003 | Kelley et al. | 709/202 |
| 7,185,284 | B2 | 2/2007 | Teng et al. | |
| 7,363,384 | B2 * | 4/2008 | Chatani et al. | 709/232 |
| 7,516,045 | B2 * | 4/2009 | Butler | 702/183 |
| 7,567,810 | B1 | 7/2009 | Overton | |
| 7,593,686 | B1 | 9/2009 | Knoop | |
| 7,779,409 | B2 * | 8/2010 | Persson et al. | 717/178 |
| 2002/0120721 | A1 * | 8/2002 | Eilers et al. | 709/220 |
| 2003/0018767 | A1 * | 1/2003 | Chatani et al. | 709/223 |
| 2003/0110234 | A1 * | 6/2003 | Egli et al. | 709/217 |
| 2004/0267965 | A1 * | 12/2004 | Vasudevan et al. | 709/250 |
| 2005/0096870 | A1 * | 5/2005 | Butler | 702/183 |
| 2005/0193098 | A1 * | 9/2005 | Khandpur et al. | 709/220 |
| 2006/0039561 | A1 * | 2/2006 | Ypya et al. | 380/270 |
| 2006/0048141 | A1 * | 3/2006 | Persson et al. | 717/176 |
| 2006/0256130 | A1 * | 11/2006 | Gonzalez | 345/619 |
| 2007/0089174 | A1 | 4/2007 | Bader et al. | |
| 2007/0130331 | A1 * | 6/2007 | Kao et al. | 709/224 |
| 2007/0225047 | A1 | 9/2007 | Bakos | |
| 2008/0068448 | A1 * | 3/2008 | Hansen | 348/14.09 |
| 2008/0189363 | A1 * | 8/2008 | Tian | 709/203 |
| 2008/0201748 | A1 * | 8/2008 | Hasek et al. | 725/98 |
| 2010/0115581 | A1 * | 5/2010 | Goldschlag et al. | 726/1 |
| 2011/0167470 | A1 * | 7/2011 | Walker et al. | 726/1 |

OTHER PUBLICATIONS

U.S. Appl. No. 12/239,140, filed Sep. 26, 2008.
U.S. Appl. No. 12/422,080, filed Apr. 10, 2009.

* cited by examiner

*Primary Examiner* — Jimmy H Tran

(57) ABSTRACT

A communication system comprises a gateway. The gateway is configured to receive a content request from a communication device, wherein the content request indicates requested content from a content provider, determine a set of capabilities of the communication device as specified by the content provider, transfer a status request to the communication device to determine a status of the set of capabilities of the communication device, receive a status response from the communication device indicating the status of the set of capabilities of the communication device, and if the status response indicates that the status of the set of capabilities complies with the set of capabilities of the communication device as specified by the content provider, then transfer the content request to the content provider.

18 Claims, 6 Drawing Sheets

ENSURING COMMUNICATION DEVICE CAPABILITIES COMPLY WITH CONTENT PROVIDER SPECIFICATIONS

TECHNICAL BACKGROUND

Many individuals are increasingly utilizing communication devices to access a communication network. A user of a communication device may request audio, video, text, and other data from a content provider over the communication network. When the user of the communication device requests content from the content provider, typically the requested content is transferred from the content provider to the communication device for the use or enjoyment of the user.

However, content providers frequently make assumptions about the configuration and capabilities of the communication device requesting the content. Thus, a problem arises when a user requests content which is not supported by the capabilities of the communication device. Unfortunately, failed attempts to transfer content to communication devices that are improperly configured or unable to receive the content can be costly, especially if the content provider is located a great distance away from the requesting communication device.

Overview

A method of operating a communication system comprises receiving a content request from a communication device, wherein the content request indicates requested content from a content provider, determining a set of capabilities of the communication device as specified by the content provider, transferring a status request to the communication device to determine a status of the set of capabilities of the communication device, receiving a status response from the communication device indicating the status of the set of capabilities of the communication device, and if the status response indicates that the status of the set of capabilities complies with the set of capabilities of the communication device as specified by the content provider, then transferring the content request to the content provider.

A communication system comprises a gateway. The gateway is configured to receive a content request from a communication device, wherein the content request indicates requested content from a content provider, determine a set of capabilities of the communication device as specified by the content provider, transfer a status request to the communication device to determine a status of the set of capabilities of the communication device, receive a status response from the communication device indicating the status of the set of capabilities of the communication device, and if the status response indicates that the status of the set of capabilities complies with the set of capabilities of the communication device as specified by the content provider, then transfer the content request to the content provider.

A method of operating a communication system comprises receiving a content request from a communication device, wherein the content request indicates requested content from a content provider, determining a set of capabilities of the communication device as specified by the content provider by transferring a first capabilities request message to a database and receiving a first capabilities response message from the database, wherein the capabilities response message comprises the set of capabilities, transferring a status request to the communication device to determine a status of the set of capabilities of the communication device, wherein the status request comprises the set of capabilities of the communication device, in the communication device, determining the status of the set of capabilities of the communication device based on the status request, receiving a status response from the communication device indicating the status of the set of capabilities of the communication device, and if the status response indicates that the status of the set of capabilities complies with the set of capabilities of the communication device as specified by the content provider, then transferring the content request to the content provider.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
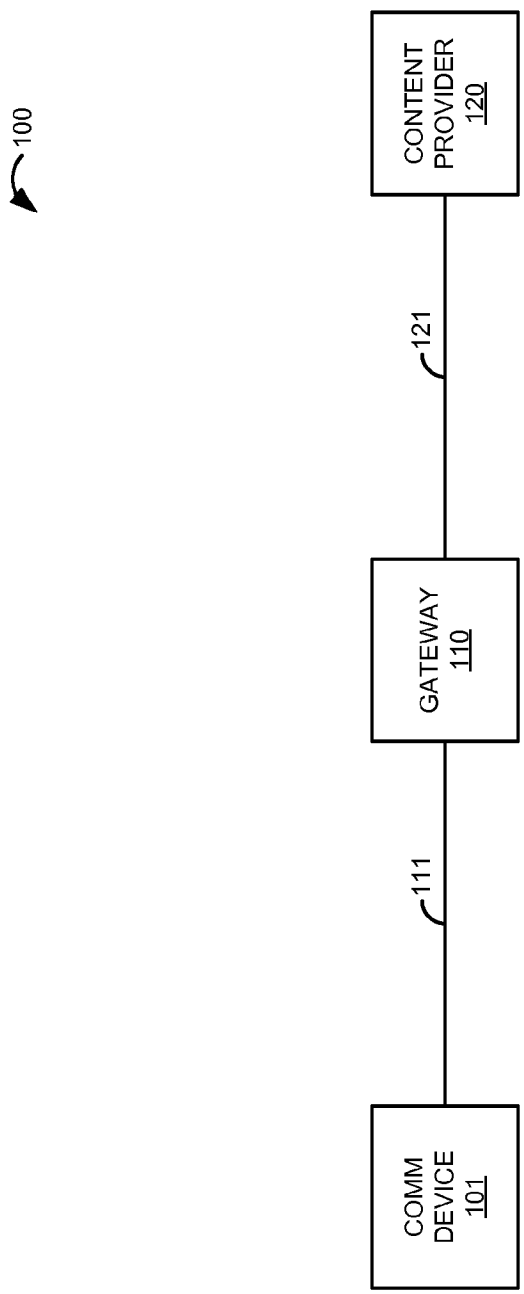
FIG. 1 is a block diagram that illustrates a communication system.

FIG. 1 is a block diagram that illustrates communication system 100. Communication system 100 includes communication device 101, gateway 110, and content provider 120. Communication device 101 communicates with gateway 110 over communication link 111. Gateway 110 is in communication with content provider 120 over communication link 121.

Figure 2:
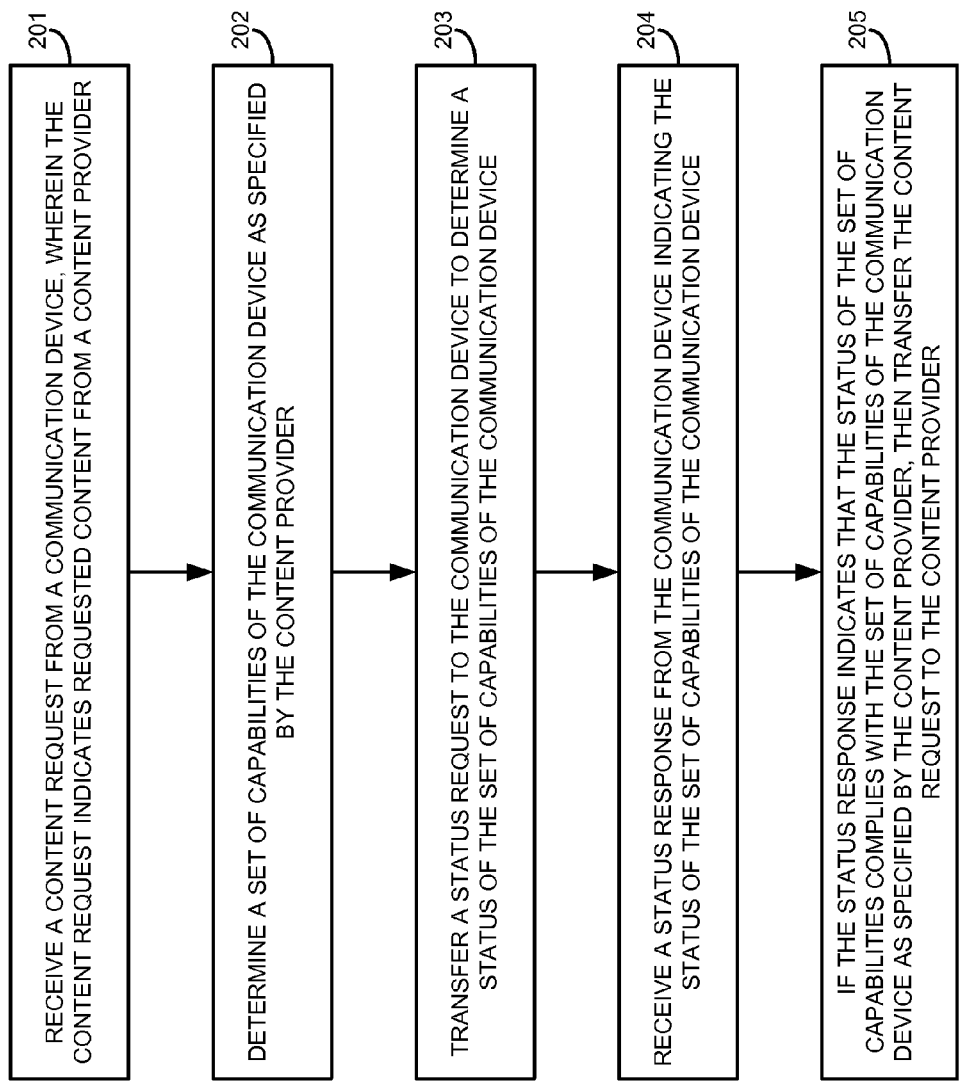
FIG. 2 is a flow diagram that illustrates an operation of the communication system.

FIG. 2 is a flow diagram that illustrates an operation of communication system 100. The steps of the operation are indicated below parenthetically. In FIG. 2, gateway 110 receives a content request from communication device 101 (201). The content request indicates requested content from a content provider 120 (201). For example, the content provider 120 could comprise a website or server, and the requested content could comprise a webpage or some other data on the server.

Gateway 110 determines a set of capabilities of communication device 101 as specified by the content provider 120 (202). The set of capabilities could comprise a set of requirements and preferences of content provider 120 that are associated with settings or functionalities of communication device 101. The set of capabilities of communication device 101 could be determined in a number of ways. For example, gateway 110 could transfer a capabilities request message to content provider 120, and receive a capabilities response message from content provider 120, wherein the capabilities response message comprises the set of capabilities. In another example, the set of capabilities of communication device 101 may be received from content provider 120 and stored in a database prior to a request for content by communication device 101. In this example, gateway 110 could transfer a first capabilities request message to the database, and receive a first capabilities response message from the database comprising the set of capabilities of communication device 101 as specified by content provider 120.

Once the set of capabilities of communication device 101 is determined, gateway 110 transfers a status request to communication device 101 to determine a status of the set of capabilities of communication device 101 (203). The status request could comprise the set of capabilities of communication device 101 as specified by content provider 120. The status requests instructs communication device 101 to determine the status of the set of capabilities of communication device 101. Communication device 101 could determine the status of the set of capabilities of communication device 101 in a variety of ways. In one example, communication device 101 compares the set of capabilities as specified by content provider 120 in the status request to the actual capabilities and settings of communication device 101 to determine the status of the set of capabilities of communication device 101.

Gateway 120 receives a status response from communication device 101 indicating the status of the set of capabilities of communication device 101 (204). The status response indicates whether the status of the set of capabilities complies with the set of capabilities as specified by content provider 120. If the status response indicates that the status of the set of capabilities complies with the set of capabilities of communication device 101 as specified by content provider 120, then gateway 110 transfers the content request to content provider 120 (205).

Advantageously, gateway 110 functions as a mediator between communication device 101 and content provider 120. In order to transfer a content request from communication device 101 to content provider 120, gateway 110 must ensure that the status of communication device 101 complies with the set of capabilities specified by content provider 120. Thus, content provider 120 will only receive content requests from communication device 101 if the settings and capabilities of device 101 match those required and/or preferred by content provider 120. Failed attempts to transfer content to a communication device that does not comply with the set of capabilities are avoided, preventing repetitive transmission attempts and preserving bandwidth.

Referring back to FIG. 1, communication device 101 comprises hardware and circuitry programmed to function as a telecommunications device. Communication device 101 may comprise a communication interface, user interface, memory device, software, processing circuitry, or some other communication components. For example, communication device 101 could comprise a telephone, wireless transceiver, mobile phone, cellular phone, smartphone, computer, personal digital assistant (PDA), e-book, game console, mobile Internet device, network interface card, media player, or some communication apparatus—including combinations thereof.

In one example, communication device 101 could comprise a wireless communication device comprising Radio Frequency (RF) communication circuitry and an antenna. The RF communication circuitry typically includes an amplifier, filter, modulator, and signal processing circuitry. Wireless network protocols that may be utilized by communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Internet, telephony, or some other network protocol—including combinations thereof.

Gateway 110 comprises a computer system and communication interface. Gateway 110 may also include other components such a router, server, data storage system, and power supply. Gateway 110 may reside in a single device or may be distributed across multiple devices. Gateway 110 may be a discrete system or may be integrated within other systems—including other systems within communication system 100. Gateway 110 could comprise a packet gateway, mobile access gateway (MAG), proxy web gateway (WG), packet data network gateway (PDN GW), mobile switching center, network gateway system, Internet access node, application server, service node, or some other communication system—including combinations thereof. Gateway 110 is in communication with content provider 120.

Content provider 120 comprises a computer system and communication interface. Content provider 120 may also include other components such a router, server, data storage system, and power supply. Content provider 120 may reside in a single device or may be distributed across multiple devices. Content provider 120 may be a discrete system or may be integrated within other systems—including other systems within communication system 100. Content provider 120 could comprise a mobile switching center, network gateway system, Internet access node, application server, service node, web server, website, or some other communication system—including combinations thereof.

Communication links 111 and 121 use metal, air, space, optical fiber such as glass or plastic, or some other material as the transport media—including combinations thereof. Communication links 111 and 121 could use various communication protocols, such as time-division multiplexing (TDM), Internet Protocol (IP), Ethernet, telephony, optical networking, hybrid fiber coax (HFC), communication signaling, wireless protocols such as CDMA, GSM, UMTS, HSPA, EV-DO, EV-DO rev. A, 3GPP LTE, WiMAX, Wi-Fi, or some other communication format—including combinations thereof. Communication links 111 and 121 could be direct links or they may include intermediate networks, systems, or devices.

Figure 3:
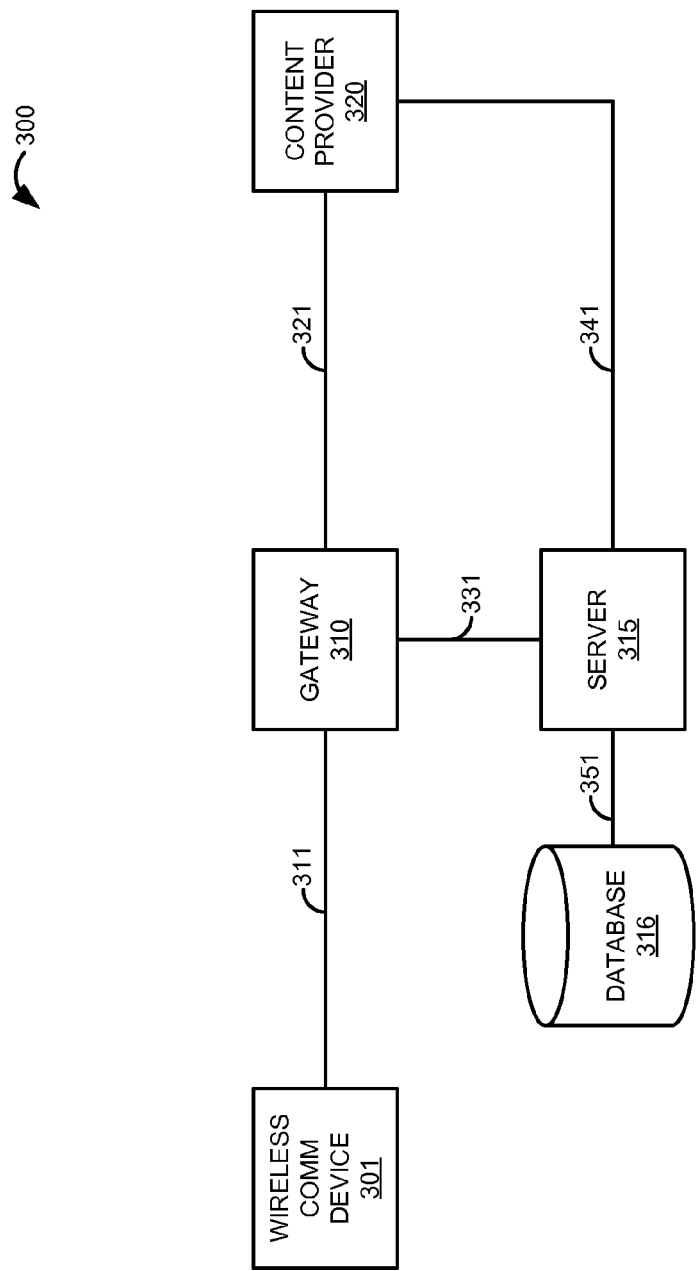
FIG. 3 is a block diagram that illustrates a communication system in an exemplary embodiment.

FIG. 3 is a block diagram that illustrates communication system 300 in an exemplary embodiment. Communication system 300 includes wireless communication device 301, gateway 310, server 315, database 316, and content provider 320. Wireless communication device 301 communicates with gateway 310 over communication link 311. Gateway 310 is in communication with content provider 320 over communication link 321. Gateway 310 is also in communication with server 315 over communication link 331. Server 315 is in communication with content provider 320 over communication link 341. Server 315 is also in communication with database 316 over communication link 351. Note that although server 315 and database 316 are shown as distributed across separate devices, server 315 and database 316 may reside in a single device. Further, server 315 and database 316 may comprise a discrete system or may be integrated within other systems—including other systems within communication system 300.

Figure 4:
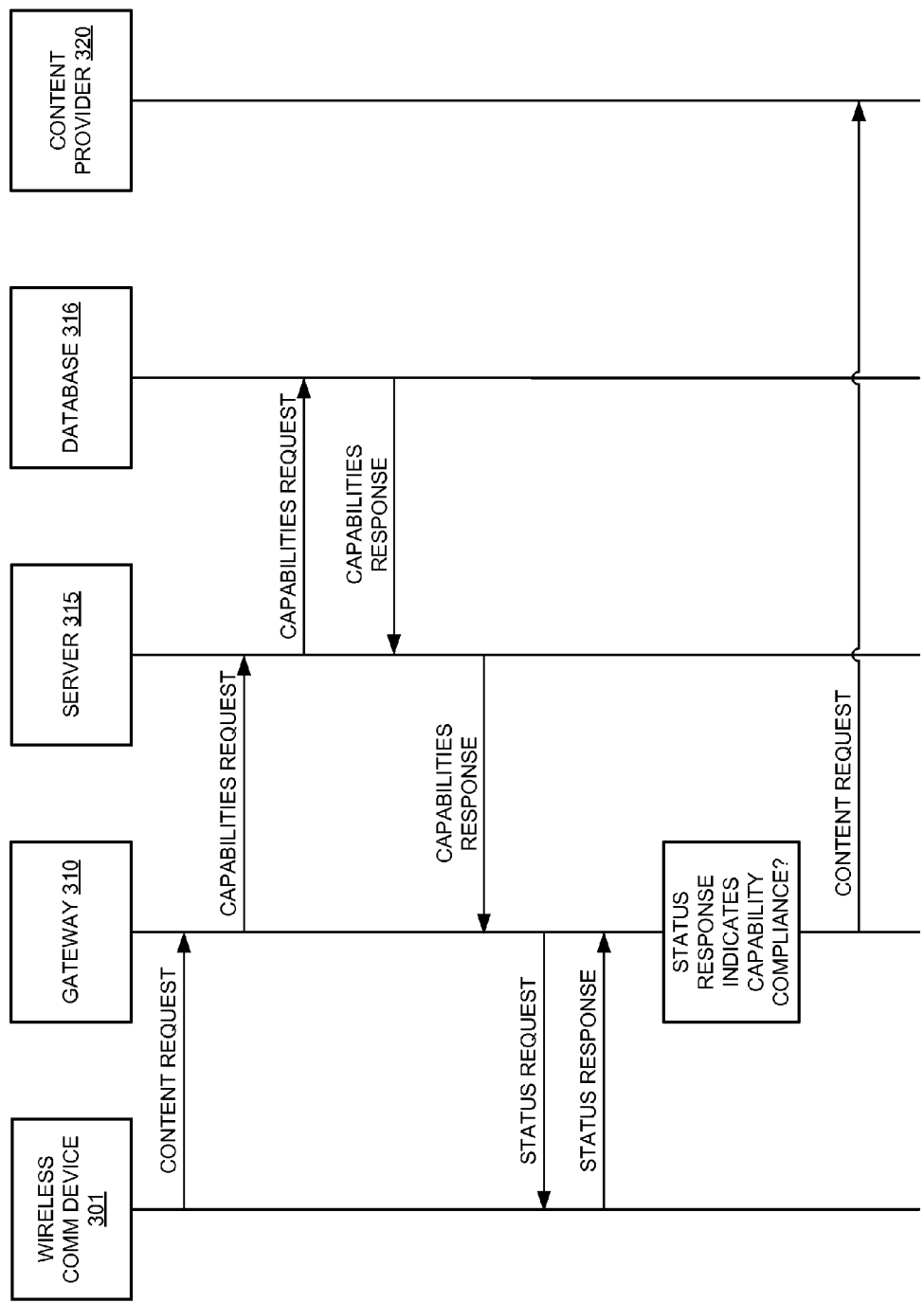
FIG. 4 is a sequence diagram that illustrates an operation of the communication system.

FIG. 4 is a sequence diagram that illustrates an operation of communication system 300. To begin, wireless communication device 301 transfers a request for content to gateway 310. Typically, the content request indicates specific data available from content provider 320. To ensure that wireless communication device 301 has the appropriate capabilities and configuration settings to receive the content, gateway 310 transfers a capabilities request message to server 315. In other examples, gateway 310 may transfer the capabilities request message directly to content provider 320.

The capabilities request message could comprise a Hypertext Transfer Protocol (HTTP) request header sent by gateway 310 to dynamically determine the settings and capabilities of wireless communication device 301 that are required or preferred by content provider 320. In FIG. 4, gateway 310 or server 315 has already received a set of capabilities of wireless communication device 301 from content provider 320, and the set of capabilities as specified by content provider 320 are already stored in database 316. Thus, server 315 transfers the capabilities request message to database 316, and database 316 transfers a capabilities response message back to server 315. The capabilities response message comprises the set of capabilities of wireless communication device 301 that are required and/or preferred by content provider 320.

Server 315 forwards the capabilities response message to gateway 310. To determine whether the status of the settings and capabilities of wireless communication device 301 comply with the capabilities of wireless communication device 301 that are required and/or preferred by content provider 320, gateway 30 transfers a status request message to wireless communication device 301. The status request message could be part of a discovery process executed by gateway 310 that utilizes any number of scripting languages known to those skilled in the art. For example, the status request message could comprise a probe script with instructions on how to detect all preferred and required traits as specified by content provider 320. The probe script could be customized depending on the device type or browser of wireless communication device 301. In addition, the probe script could automatically change any settings that fail to comply with the set of capabilities required by content provider 320 in order to ensure compliance. Likewise, the probe script could automatically download and install plug-ins, applications, or other data required by content provider 320 to receive the requested content. The probe script could also be configured to ask the user for approval prior to changing any settings or downloading and installing any applications.

Wireless communication device 301 determines the status of the set of capabilities of wireless communication device 301 based on the status request. In one example, wireless communication device 301 determines the status of the set of capabilities by executing the probe script. Once the status of the settings and capabilities of wireless communication device 301 are determined, wireless communication device 301 transfers a status response message to gateway 310. In one example, the status response message could be generated and transferred in response to instructions contained in the probe script. The status response message could comprise a signed response using a secure token which indicates the support on wireless communication device 301 for the traits specified by content provider 320.

Gateway 310 determines whether the status response indicates compliance with the set of capabilities of wireless communication device 301 as specified by content provider 320. If gateway 310 determines that wireless communication device 301 has the appropriate capabilities and is configured to receive the content without error, then gateway 320 transfers the content request to content provider 320. Content provider 320 would then provide the requested content to wireless communication device 301 via gateway 310.

Figure 5:
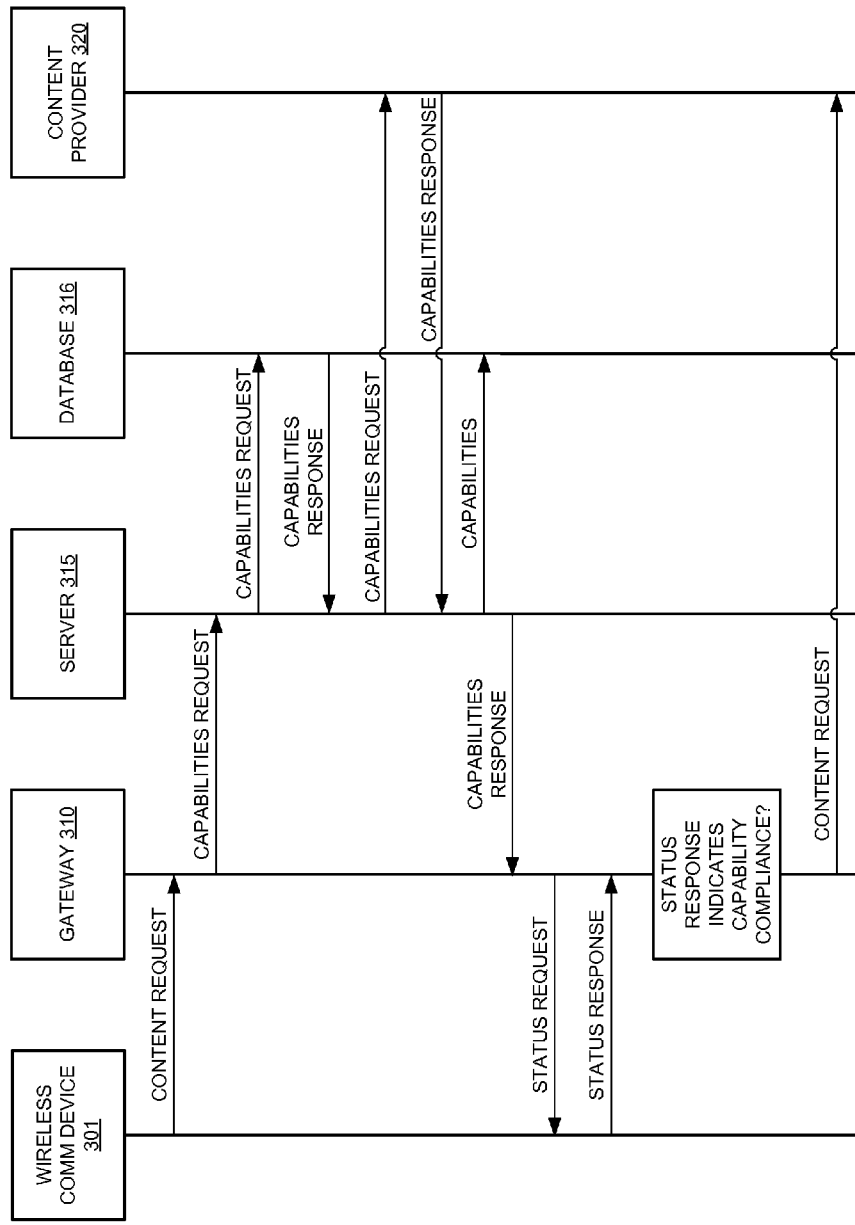
FIG. 5 is a sequence diagram that illustrates an operation of the communication system.

FIG. 5 is a sequence diagram that illustrates an operation of communication system 300. The operation depicted in FIG. 5 is similar to the one shown in FIG. 4, except in FIG. 5 the set of capabilities of wireless communication device 301 as specified by content provider 320 have not been stored in database 316. Thus, when server 315 transfers the capabilities request message to database 316, database 316 transfers a capabilities response message to server 315 which does not comprise the set of capabilities.

In response to receiving the capabilities response message from database 316 which does not comprise the set of capabilities, server 315 transfers a second capabilities request message to content provider 320. The capabilities request message could comprise a Hypertext Transfer Protocol (HTTP) request header sent by server 315 to dynamically determine the settings and capabilities of wireless communication device 301 that are required or preferred by content provider 320. Server 315 receives a second capabilities response message from content provider 320, and the second capabilities response message comprises the set of capabilities of wireless communication device 301 as specified by content provider 320. Optionally, server 315 could then store the set of capabilities in database 316, as shown in FIG. 5.

The set of capabilities could comprise requirements of content provider 320, preferences of content provider 320, and a retry location. The requirements could be contained in an HTTP response header utilized by content provider 320 to indicate all the settings and capabilities required to ensure appropriate interaction between wireless communication device 301 and content provider 320 when the requested content is delivered. For example, content provider 320 could transfer an HTTP response with the header "Require: cookies-enabled" to indicate that unless cookies are supported and enabled in wireless communication device 301, the content request will be rejected. Some examples of traits that content provider 320 may require include a particular operating platform, network type, header, location, service plan, service level agreement (SLA), content handler, virtual machine, customer credit, RF signal strength, backhaul link load, or available bandwidth.

Likewise, the preferences of content provider 320 could be contained in an HTTP response header utilized by content provider 320 to indicate all settings and capabilities preferred by content provider 320. In this case, wireless communication device 301 may still engage in session communications with content provider 320, although possibly in a more limited manner than if all the requirements and preferences are met. In this case, either wireless communication device 301 or gateway 310 may determine whether to risk engaging in session communications with content provider 320. Some examples of traits that content provider 320 may prefer include particular applications that device 301 may use to process the content. For example, if the requested content is an image file, wireless communication device 301 may have several image viewing applications available, but content provider 320 may specify a preferred image viewer for device 301 to use for optimal image quality or display properties. In other examples, content provider 320 may provide preferred or trusted virtual machines or digital rights management (DRM) handlers for wireless communication device 301 to use in conjunction with the requested content.

In addition to the requirements and preferences of content provider 320, the set of capabilities could also comprise a retry location. The retry location could be contained in an HTTP response header to indicate a location to redirect wireless communication device 301 in the event that all capabilities in the "Require" header are not supported. The retry location could comprise a website which instructs a user of wireless communication device 301 to enable or disable certain settings, install a particular plug-in or application, or otherwise inform the user of an incompatibility between device 301 and content provider 320. In addition, the operation of the existing "Location" HTTP header could be modified whenever accompanied by the "Retry location" header. If both the "Retry location" and the "Location" headers are contained in the same HTTP response, the "Location" header would only be used if all the requirements of content provider 320 are supported by device 301. In this case, wireless communication device 301 would be connected to the location of the requested content as provided in the "Location" header.

Referring again to FIG. 5, after the capabilities are obtained from content provider 320 in the capabilities response message, server 315 transfers the capabilities response message to gateway 310, which could be performed utilizing the HTTP response headers as discussed above. To determine whether the status of the settings and capabilities of wireless communication device 301 comply with the capabilities of wireless communication device 301 as specified by content provider 320, gateway 30 transfers a status request message to wireless communication device 301.

Wireless communication device 301 determines the status of the set of capabilities of wireless communication device 301 based on the status request. In one example, the status request could comprise instructions to redirect wireless communication device 301 to the retry location if the status of the set of capabilities of device 301 indicates noncompliance with the requirements of content provider 320. In another example, the status request could comprise instructions to configure wireless communication device 301 to comply with the requirements of content provider 320. In another example, the status request could comprise instructions to configure wireless communication device 301 to comply with the preferences of content provider 320. In another example, the status request could comprise instructions for wireless communication device 301 to download an application necessary to comply with the requirements of content provider 320. The status request could comprise a probe script, and any instructions contained in the status request could be processed by wireless communication device 301 by executing the probe script.

Once the status of the settings and capabilities of wireless communication device 301 are determined, wireless communication device 301 transfers a status response message to gateway 310. In one example, the status response message could be generated and transferred in response to instructions contained in the probe script. The status response message could comprise a secure token which indicates the support on wireless communication device 301 for the traits specified by content provider 320.

Gateway 310 determines whether the status response indicates compliance with the set of capabilities of wireless communication device 301 as specified by content provider 320. If gateway 310 determines that wireless communication device 301 has the appropriate capabilities and is configured to receive the content without error, then gateway 320 transfers the content request to content provider 320. Content provider 320 would then provide the requested content to wireless communication device 301 over gateway 310.

Figure 6:
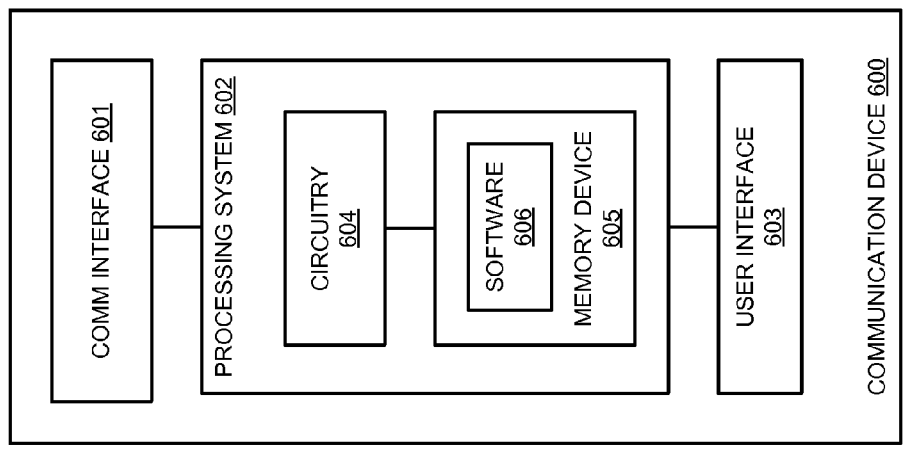
FIG. 6 is a block diagram that illustrates a communication device.

FIG. 6 is a block diagram that illustrates communication device 600. Communication device 600 provides an example of communication device 101, although device 101 could use alternative configurations. Communication device 600 comprises communication interface 601, processing system 602, and user interface 603. Processing system 602 is linked to communication interface 601 and user interface 603. Processing system 602 includes processing circuitry 604 and memory device 605 that stores operating software 606. Communication device 600 may include other well-known components such as a battery and enclosure that are not shown for clarity. Communication device 600 may comprise a telephone, computer, e-book, mobile Internet appliance, media player, game console, network interface card, or some other communication apparatus—including combinations thereof.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 603 comprises components that interact with a user to receive user inputs and to present media and/or information. User interface 603 may include a speaker, microphone, buttons, lights, display screen, touch screen, touch pad, scroll wheel, communication port, or some other user input/output apparatus—including combinations thereof. User interface 603 may be omitted in some examples.

Processing circuitry 604 comprises microprocessor and other circuitry that retrieves and executes operating software 606 from memory device 605. Memory device 605 comprises a disk drive, flash drive, data storage circuitry, or some other memory apparatus. Processing circuitry 604 is typically mounted on a circuit board that may also hold memory device 605 and portions of communication interface 601 and user interface 603. Operating software 606 comprises computer programs, firmware, or some other form of machine-readable processing instructions. Operating software 606 may include an operating system, utilities, drivers, network interfaces, applications, or some other type of software. When executed by processing circuitry 604, operating software 606 directs processing system 602 to operate communication device 600 as described herein. In particular, operating software 606 directs processing system 602 to transfer a content request, receive a status request, determine a status of a set of capabilities of the communication device based on the status request, and transfer a status response.

Figure 7:
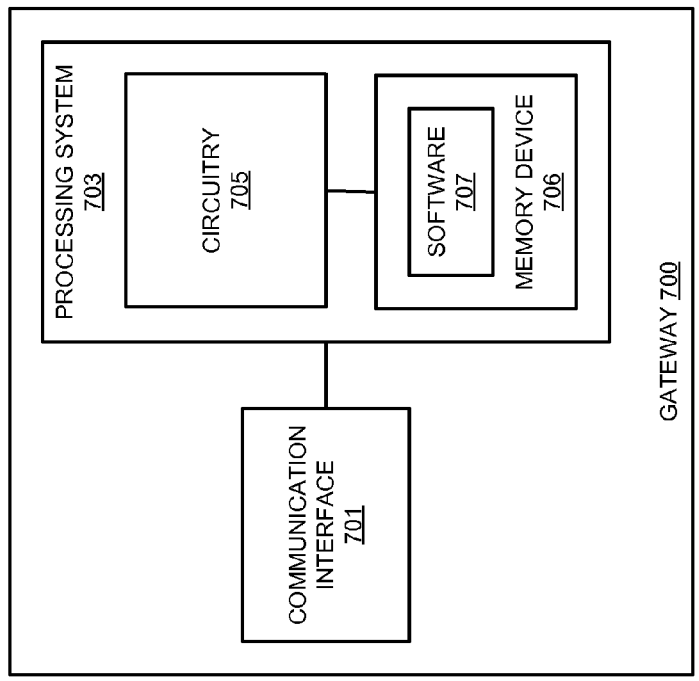
FIG. 7 is a block diagram that illustrates a gateway.

FIG. 7 is a block diagram that illustrates gateway 700. Gateway 700 provides an example of gateway 110, although gateway 110 may use alternative configurations. Gateway 700 comprises communication interface 701 and processing system 703. Processing system 703 is linked to communication interface 701. Processing system 703 includes processing circuitry 705 and memory device 706 that stores operating software 707.

Communication interface 701 comprises components that communicate over communication links, such as network cards, ports, RF transceivers, processing circuitry and software, or some other communication components. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

Processing circuitry 705 comprises microprocessor and other circuitry that retrieves and executes operating software 707 from memory device 706. Memory device 706 comprises a disk drive, flash drive, data storage circuitry, or some other memory apparatus. Operating software 707 comprises computer programs, firmware, or some other form of machine-readable processing instructions. Operating software 707 may include an operating system, utilities, drivers, network interfaces, applications, or some other type of software. When executed by circuitry 705, operating software 707 directs processing system 703 to operate as described herein. In particular, operating software 707 directs processing system 703 to receive a content request from a communication device, determine a set of capabilities of the communication device as specified by a content provider, transfer a status request to the communication device to determine a status of the set of capabilities of the communication device, receive a status response from the communication device indicating the status of the set of capabilities of the communication device, and if the status response indicates that the status of the set of capabilities complies with the set of capabilities of the communication device as specified by the content provider, then transfer the content request to the content provider.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
   receiving a content request transmitted from a communication device, wherein the content request indicates requested content from a content provider;
   determining a set of capabilities of the communication device as specified by the content provider;
   transferring a status request for delivery to the communication device to determine a status of the set of capabilities of the communication device;
   receiving a status response transmitted from the communication device indicating the status of the set of capabilities of the communication device, wherein the status of the set of capabilities of the communication device indicates whether settings within the communication device are set to comply with the set of capabilities of the communication device as specified by the content provider; and
   if the status response indicates that the status of the set of capabilities complies with the set of capabilities of the communication device as specified by the content provider, then transferring the content request for delivery to the content provider.

2. The method of claim 1 wherein determining the set of capabilities of the communication device comprises:
   transferring a capabilities request message to the content provider; and
   receiving a capabilities response message from the content provider, wherein the capabilities response message comprises the set of capabilities.

3. The method of claim 1 wherein determining the set of capabilities of the communication device comprises:
   transferring a first capabilities request message to a database;
   receiving a first capabilities response message from the database;
   if the first capabilities response message does not comprise the set of capabilities, then:
      transferring a second capabilities request message to the content provider;
      receiving a second capabilities response message from the content provider, wherein the second capabilities response message comprises the set of capabilities; and
      storing the set of capabilities of the communication device in the database.

4. The method of claim 1 wherein the set of capabilities comprises requirements of the content provider, preferences of the content provider, and a retry location.

5. The method of claim 4 wherein the status request comprises instructions to redirect the communication device to the retry location if the status of the set of capabilities of the communication device indicates noncompliance with the requirements of the content provider.

6. The method of claim 4 wherein the status request comprises instructions to configure the communication device to comply with the requirements of the content provider.

7. The method of claim 6 wherein the instructions to configure the communication device to comply with the requirements of the content provider direct the communication device to automatically configure settings within the communication device to comply with the requirements of the content provider.

8. The method of claim 4 wherein the status request comprises instructions to configure the communication device to comply with the preferences of the content provider.

9. The method of claim 4 wherein the status request comprises instructions for the communication device to download an application necessary to comply with the requirements of the content provider.

10. A communication system comprising:
    a gateway, wherein the gateway comprising program instructions stored in memory and executed by a hardware processor, configured to receive a content request transmitted from a communication device, wherein the content request indicates requested content from a content provider, determine a set of capabilities of the communication device as specified by the content provider, transfer a status request for delivery to the communication device to determine a status of the set of capabilities of the communication device, receive a status response transmitted from the communication device indicating the status of the set of capabilities of the communication device, wherein the status of the set of capabilities of the communication device indicates whether settings within the communication device are set to comply with the set of capabilities of the communication device as specified by the content provider, and if the status response indicates that the status of the set of capabilities complies with the set of capabilities of the communication device as specified by the content provider, then transfer the content request for delivery to the content provider.

11. The system of claim 10 wherein the gateway, to determine the set of capabilities of the communication device, transfers a capabilities request message to the content provider, and receives a capabilities response message from the content provider, wherein the capabilities response message comprises the set of capabilities.

12. The system of claim 10 wherein the gateway, to determine the set of capabilities of the communication device, transfers a first capabilities request message to a database, receives a first capabilities response message from the database, if the first capabilities response message does not comprise the set of capabilities, then the gateway transfers a second capabilities request message to the content provider, receives a second capabilities response message from the content provider, wherein the second capabilities response message comprises the set of capabilities, and stores the set of capabilities of the communication device in the database.

13. The system of claim 10 wherein the set of capabilities comprises requirements of the content provider, preferences of the content provider, and a retry location.

14. The system of claim 13 wherein the status request comprises instructions to redirect the communication device to the retry location if the status of the set of capabilities of the communication device indicates noncompliance with the requirements of the content provider.

15. The system of claim 13 wherein the status request comprises instructions to configure the communication device to comply with the requirements of the content provider.

16. The system of claim 13 wherein the status request comprises instructions to configure the communication device to comply with the preferences of the content provider.

17. The system of claim 13 wherein the status request comprises instructions for the communication device to download an application necessary to comply with the requirements of the content provider.

18. A method of operating a communication system, the method comprising:
  receiving a content request transmitted from a communication device, wherein the content request indicates requested content from a content provider;
  determining a set of capabilities of the communication device as specified by the content provider by transferring a first capabilities request message to a database and receiving a first capabilities response message from the database, wherein the capabilities response message comprises the set of capabilities;
  transferring a status request for delivery to the communication device to determine a status of the set of capabilities of the communication device, wherein the status request comprises the set of capabilities of the communication device;
  in the communication device, determining the status of the set of capabilities of the communication device based on the status request, wherein the status of the set of capabilities of the communication device indicates whether settings within the communication device are set to comply with the set of capabilities of the communication device as specified by the content provider;
  receiving a status response transmitted from the communication device indicating the status of the set of capabilities of the communication device; and
  if the status response indicates that the status of the set of capabilities complies with the set of capabilities of the communication device as specified by the content provider, then transferring the content request for delivery to the content provider.

* * * * *